Patented May 26, 1953

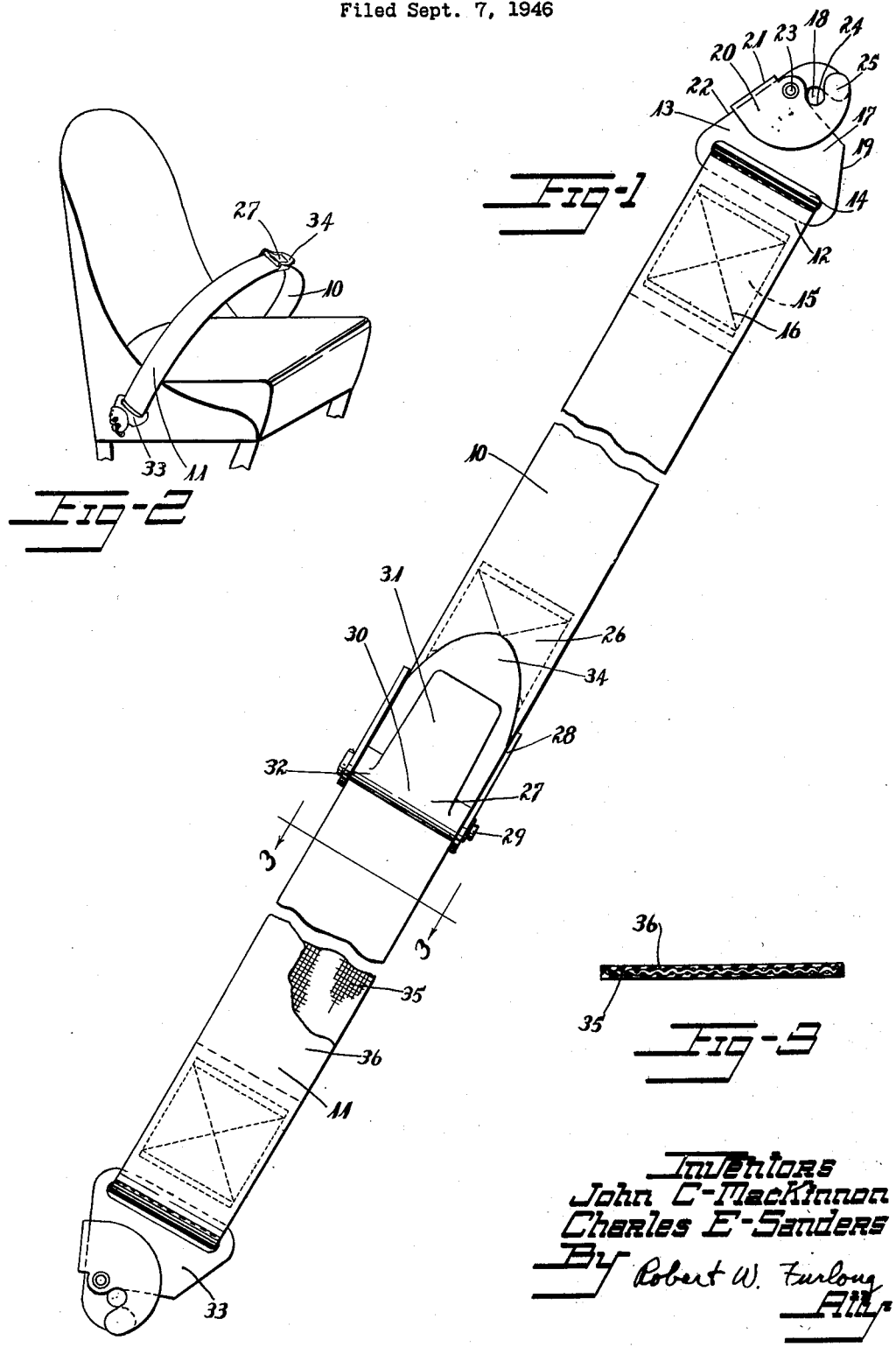
May 26, 1953    C. E. SANDERS ET AL    2,639,852
SAFETY BELT
Filed Sept. 7, 1946
Inventors
John C. MacKinnon
Charles E. Sanders
By Robert W. Furlong
Atty.

2,639,852

UNITED STATES PATENT OFFICE 2,639,852

SAFETY BELT

Charles E. Sanders, Needham, and John C. MacKinnon, Wellesley, Mass., assignors to The B. F. Goodrich Company, New York, N. Y., a corporation of New York Application September 7, 1946, Serial No. 695,460

2 Claims. (Cl. 227—49)

This invention relates to a safety belt, and particularly to a safety belt having improved physical characteristics.

The principal objects of this invention are to provide a belt-like article, such as a safety belt, having a surface substantially impervious to dirt, grease and moisture; to provide the article with a surface which may be readily cleaned; to lengthen the life of the article by reducing fraying, abrasion and deterioration of the materials comprising the belt; to provide a belt having lateral stability without undue lateral rigidity; to accomplish the foregoing objects without substantially reducing the flexibility of the article; and generally to provide an article of neat and pleasing appearance, which can readily be kept in a clean condition.

A safety belt such as those commonly used on commercial airlines must possess a number of properties. The belt must be flexible enough to be worn comfortably without cutting into the sensitive abdomen of the wearer when the body weight is suddenly thrown against it. It must possess high tensile strength, and the breaking strength must be retained over a long period of service. The belt must be resistant to fraying, abrasion and deterioration from moisture, temperature changes or other causes. The surface of the belt must be such that the belt is firmly locked by means of the corrugated frictional fastening buckle commonly used without offering resistance to disengagement of the buckle when the belt is unfastened, and without loss of strength from the clamping action of the buckle. The belt also must be light in weight, and desirably presents a pleasing appearance even after prolonged use. This necessitates the use of a belt which is easily cleaned, and which has a surface impervious to dirt, grease and the like. Because of the incidence of air-sickness, the belt must be resistant to body acids, and must be of such a nature that it will not retain offensive odors.

The manufacture of safety belts from rubber possessing a high tensile strength has been considered. Such belts, however, necessitate the use of a highly loaded composition to increase the tensile strength and reduce the elasticity and this reduces the flexibility too far for the belt to be worn comfortably. Furthermore, such a belt is heavier than is desirable for use in airplanes where the reduction of weight is especially important. The most commonly used safety belts are made of a woven textile material, such as cotton webbing, which is strong, light and flexible.

This material has the disadvantage common to foraminous material, however, in that dirt, grease, moisture and body acids easily penetrate the webbing and are difficult to remove. In addition, the webbing is subject to fraying, abrasion and deterioration from moisture, mildewing, body acids and other causes. The absorbent material retains offensive odors, which must be removed by laundering, and frequent laundering reduces the strength of the belting material.

Lighter-weight webbing of the requisite tensile strength can be used to reduce the problem of maintenance, but such webbing has insufficient lateral stability. An airplane safety belt is designed for use as an abdominal belt; and when the passenger's weight is thrown against it, the belt must have sufficient lateral stability to remain substantially flat. Light-weight webbing alone rolls up into a rope-like band under these conditions and exerts a cutting action in a very narrow region across the abdomen; while a belt of greater lateral stability remains substantially flat, whereby the body weight is distributed over a larger portion of the abdomen.

Leather belts may be used for lateral stability, but a belt having sufficient lateral stability has undue lateral rigidity, so that the hard edges of the leather exert as great a cutting action on the sensitive abdomen as does the light-weight webbing. Furthermore, a leather belt of sufficient lateral stability is relative inflexible, and the locking buckle cannot grip the surface sufficiently well to provide a safety factor against slippage in service. If leather having a rough surface is used, it is difficult to keep it clean and free of offensive odors; in addition, such a belt is attacked by body acids in much the same manner as uncovered textile materials are.

Belts of a solid material such as rubber or leather have a further disadvantage. If one edge of the belt is cut, the solid material will tear across the belt much more easily than would a discontinuous or foraminous material. This does not leave a sufficient margin of safety for use of such solid materials.

By means of this invention, a belt is provided which possesses the requisite physical properties, can be easily cleaned, and presents a pleasing appearance at all times. An article embodying this invention comprises a belt-like article having a flexible foraminous base member covered with a continuous surface layer of flexible thermoplastic material.

A preferred embodiment of the invention is illustrated by the accompanying drawings of which:

Fig. 1 is a perspective view of an airplane safety belt constructed in accordance with this invention, a portion being broken away for clarity of illustration;

Fig. 2 is a perspective view of the belt in use;

Fig. 3 is a section taken on line 3—3 of Fig. 1.

In the preferred embodiment, as illustrated in Fig. 1, the airplane safety belt, comprises a pair of complementary belt-like articles which are hereafter referred to as the left member 10 and the right member 11. The outer end 12 of the left member 10 has a metal fastening means 13 attached thereto. The fastening means 13 is attached by means of a slot 14 in the means through which a portion 15 of the left member 10 passes; this portion then being folded back against the member itself and stitched thereto as indicated generally by the numeral 16 of Fig. 1.

The outer fastening means 13 preferably comprises a triangular aluminum plate 17 having a notch 18 cut inwardly from the lower side 19 of the triangle. A bracket member 20 is positioned around the plate 17 with the closed end 21 of the bracket lying over the upper side 22 of the triangular plate. The bracket member 20 is held in position by a pin 23 about which the bracket member may be rotated. The bracket member 20 is notched at 24 reversely to the notched plate so as to provide a pair of jaws 25, 25 which may be rotated so as to open the notch 18 in the plate 17 into which a fastening eye may be inserted, and then rotated back to close the opening whereby the end of the member is securely fastened to the eye which is positioned on the edge of the airplane seat.

The inner end 26 of the left member 10 has a friction locking buckle 27 attached thereto in the same manner as the outer fastening means 13. This locking buckle 27 comprises a U-shaped plate 28 with a pin 29 holding a locking member 30 across between the legs of the U. The locking member 30 is of conventional design, comprising an elongated flat handle 31 which flares out at the lower end thereof to form an eccentric roll-like portion 32 having a corrugated lower face. The locking member 30 rotates about the pin 29 so that when the handle 31 is rotated toward the base of the U-plate, the corrugated roll face engages the surface of a belt, which is placed between the locking member and the base of the U-plate and holds the belt in a locked condition.

The right belt-like member 11 has an outer fastening means 33 which is identical with that attached to the left member which has been described in detail. The inner end 34 of the right member slips through the locking buckle 27 and is securely held in place as previously described.

The belt-like articles 10 and 11 each comprise a base member 35, which is preferably of cotton webbing. The surfaces of this webbing are impregnated with a flexible thermoplastic material, preferably plasticized polyvinyl chloride, in a continuous adherent surface-coating layer 36, which is preferably augmented on cut edges of the webbing by an additional coat of a cement of the coating material to obviate any chance of fraying. This surface layer is impervious to dirt, grease, moisture and the like, and does not substantially reduce the flexibility of the belt. Light-weight webbing of the requisite tensile strength may be used, and the surface coating imparts sufficient lateral stability without causing undue lateral rigidity. The finished article is comparable in weight to the conventional heavy webbing belt. The surface layer protects the webbing from fraying and abrasion, and also prevents mildewing and deterioration of the webbing. The surface is resistant to body acids, and does not absorb or retain offensive odors. The continuous surface layer is readily cleaned, and presents a pleasing appearance at all times, especially since the flexible surface layer may be colored as desired. The flexible thermoplastic material furnishes an excellent gripping surface for the locking means, which is not true of a belt constructed entirely of rubber or leather of the requisite strength and durability. In addition, the locking buckle may be readily released without sticking, and the clamping action does not impair the surface coating. The coating material penetrates the interstices of the webbing and forms a mechanical interlock between the surface layers so that they do not slip on the webbing, but form an integral part of the belt.

The invention has been described in detail with reference to a particular airplane safety belt, but is applicable to any safety belt where flexibility, strength, prolonged service life and ease of cleaning are desirable. The use of a foraminous base member is desirable from the safety standpoint so that a cut on one edge of the belt will not cause the belt to tear across its width. This base member is preferably lightweight cotton webbing from the standpoint of economy and weight but any woven textile material or other suitable material may be used. Since the flexible coating material imparts lateral stability, the base material may be of a weftless or weak-wefted cord fabric construction whereby each strand operates independently and the failure of a single cord does not appreciably diminish the overall strength of the belt. Furthermore, the weight of the cord is all applied in attaining longitudinal strength, without the necessity of weft cords.

The surface coating layer may be of any material which remains flexible over the ordinary temperature range which is encountered in service, and such film-forming thermoplastic materials as plasticized polyvinyl chloride, polyvinylidene chloride, or other vinyl or acrylic resins and similar materials or mixtures of these materials are especially suitable. The material which is used must be adherent to the base member and have a continuous surface which does not crack upon being flexed. It may be applied from solution or aqueous dispersion, or it may be calendered or extruded on the foraminous base member, or a combination of these methods may be used whereby the thermoplastic material becomes an integral part of the belt.

The fastening means may be any of the commonly used safety fasteners, such as buckles, snaps and the like, and are preferably of metal, although other materials having sufficient strength and resistance to deformation may be used.

An article prepared in accordance with this invention is flexible enough to be worn comfortably, has the requisite tensile strength to insure safety in use, is resistant to abrasion and fraying, and is impervious to dirt, grease, moisture and the like. It gives a prolonged service life since it will not mildew or rot, and withstands sun aging and the action of oils and body acids. The foraminous base member provides a safety factor in case the edge of the belt is cut. The surface of the article is readily cleaned, and presents a neat and pleasing appearance throughout the life of the article. The belt has lateral stability without undue lateral rigidity, and is comparable in weight to the conventional belt. The surface is not attacked by body acids and does not retain offensive odors. The locking buckle grips the impervious surface in a safely locked condition.

While the invention has been described in considerable detail with reference to certain preferred embodiments, it will be understood that variations and modifications thereof may be effected without departing from the spirit and scope of the invention as defined in the appended claims.

We claim:

1. A two-strap safety belt, each strap comprising a light-weight elongated flexible web of textile fabric having considerably greater width than thickness, a continuous uninterrupted coating enveloping said web, said coating comprising a flexible thermoplastic vinyl resin, the coating on one face of said web being integrally joined to that on the opposite face thereof through the interstices of said web and around the margins thereof to interlock said coating with said web, and fastening means for the ends of said straps comprising a friction clamp buckle, the webs of said strap being completely embedded in their coatings whereby the coating provides a smooth, tough, uninterrupted surface for cooperation with said buckle.

2. A two-strap safety belt, each strap comprising a light-weight elongated flexible web of textile fabric having considerably greater width than thickness, a continuous uninterrupted coating enveloping said web, said coating comprising flexible plasticized polyvinyl chloride, the coating on one face of said web being integrally joined to that on the opposite face thereof through the interstices of said web and around the margins thereof to interlock said coating with said web, and fastening means for the ends of said straps comprising a friction clamp buckle, the webs of said strap being completely embedded in their coatings whereby the coating provides a smooth, tough, uninterrupted surface for cooperation with said buckle.

CHARLES E. SANDERS.
JOHN C. MacKINNON.

References Cited in the file of this patent

UNITED STATES PATENTS

| Number | Name | Date |
|---|---|---|
| 1,895,222 | Johnson | Jan. 24, 1933 |
| 2,015,103 | Dreyfus et al. | Sept. 24, 1935 |
| 2,063,649 | Woodruff | Dec. 8, 1936 |
| 2,148,244 | Plotkin | Feb. 21, 1939 |
| 2,204,859 | Hyatt | June 18, 1940 |
| 2,216,760 | Ledrich | Sept. 24, 1940 |
| 2,394,523 | Pancoe | Feb. 5, 1946 |
| 2,431,745 | Flanagan | Dec. 2, 1947 |
| 2,475,588 | Bierman | July 12, 1949 |
| 2,485,725 | Francis | Oct. 25, 1949 |